(12) United States Patent
Staar et al.

(10) Patent No.: US 11,086,861 B2
(45) Date of Patent: Aug. 10, 2021

(54) TRANSLATING A NATURAL LANGUAGE QUERY INTO A FORMAL DATA QUERY

(71) Applicant: International Business Machines Corporation, Armonk, NY (US)

(72) Inventors: Peter Willem Jan Staar, Wadenswil (CH); Michele Dolfi, Zurich (CH); Christoph Auer, Zurich (CH); Leonidas Georgopoulos, Zurich (CH); Aleksandros Sobczyk, Rueschlikon (CH); Tim Jan Baccaert, Lint (BE); Konstantinos Bekas, Horgen (CH)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 16/446,809

(22) Filed: Jun. 20, 2019

(65) Prior Publication Data
US 2020/0401590 A1 Dec. 24, 2020

(51) Int. Cl.
*G10L 15/22* (2006.01)
*G06F 16/2452* (2019.01)
*G06F 40/35* (2020.01)
*G06F 40/40* (2020.01)

(52) U.S. Cl.
CPC ........ *G06F 16/24522* (2019.01); *G06F 40/35* (2020.01); *G06F 40/40* (2020.01)

(58) Field of Classification Search
CPC ...... G06F 16/242; G06F 16/243; G06F 3/167; G10L 15/22
See application file for complete search history.

(56) References Cited

U.S. PATENT DOCUMENTS 5,265,014 A * 11/1993 Haddock ............... G06F 40/253
704/9
5,911,138 A * 6/1999 Li ........................ G06F 16/248
(Continued)

FOREIGN PATENT DOCUMENTS

CN 109241103 A 1/2019
CN 109241259 A 1/2019

OTHER PUBLICATIONS

Bhowmick, S.S., et al., "Visual Graph Querying", Encyclopedia of Big Data Technologies, 2018, http://www.ntu.edu.sg/home/assourav/papers/EBDT-18-visualGraphQuery.pdf, Accessed on Jun. 17, 2019, 9 pages.
(Continued)

*Primary Examiner* — Daniel Abebe
(74) *Attorney, Agent, or Firm* — Scully, Scott, Murphy & Presser, P.C.; Daniel P. Morris (57) ABSTRACT

A computer-implemented method for generating ground-truth for natural language querying may include providing a knowledge graph as data model, receiving a natural language query from a user and translating the natural language query into a formal data query. The method can also include visualizing the formal data query to the user and receiving a feedback response from the user. The feedback response can include a verified and/or edited formal data query. The method can also include storing the natural language query and the corresponding feedback response as ground-truth pair. Corresponding system and a related computer program product may be provided.

24 Claims, 7 Drawing Sheets

(56) References Cited

U.S. PATENT DOCUMENTS

| | | | |
|---|---|---|---|
| 8,548,799 B2* | 10/2013 | Norton | G06F 16/3322 704/9 |
| 10,318,586 B1* | 6/2019 | Rose | G06F 3/0482 |
| 2007/0174350 A1* | 7/2007 | Pell | G06F 3/038 |
| 2012/0158633 A1 | 6/2012 | Eder | |
| 2016/0373423 A1 | 12/2016 | Naibo | |
| 2018/0052842 A1 | 2/2018 | Hewavitharana et al. | |
| 2018/0075131 A1 | 3/2018 | Van Hoof et al. | |
| 2019/0272296 A1* | 9/2019 | Prakash | G06F 16/243 |

OTHER PUBLICATIONS

Li, G., et al., "Svega: Answering Natural Language Questions over Knowledge Base with Semantic Matching", The 30th International Conference on Software Engineering and Knowledge Engineering, https://ksiresearchorg.ipage.com/seke/seke18paper/seke18paper_119.pdf, Accessed on Jun. 17, 2019, 6 pages.

International Search Report dated Sep. 29, 2020 issued in PCT/IB2020/055618, 9 pages.

* cited by examiner

NLQ: Who is the expert in Company A in the field of Artificial Intelligence (AI)?

NLQ: Who is the expert in Company A in the field of Artificial Intelligence?

TRANSLATING A NATURAL LANGUAGE QUERY INTO A FORMAL DATA QUERY

BACKGROUND

The present disclosure relates to a computer-implemented method for ground-truth generation.

The present disclosure further relates to a corresponding system, a corresponding computer program product and a corresponding user interface.

Natural language querying (NLQ) is a scientific domain that is investigating how machines can be queried using natural language. In general, in order to perform a natural language query, one requires a data-model, a formal data-query language on that data-model and a method to translate the natural language query into a formal data-query language. A formal data query language may also be denoted as machine data-query language.

The most common data-structure used to represent knowledge is knowledge graphs. Knowledge graphs comprise nodes representing entities and links between nodes, which may represent facts or relations.

Several different types of formal data-query languages have been designed over the past decades in order to query these knowledge graphs. Examples of such query languages are SPARQL, Cypher (neo4j) and Gremlin (Apache Tinkerpop™).

These query languages have in common that usually a query needs to be composed from a limited set of low-level operation primitives. Defining such queries needs usually detailed knowledge of the query language and its syntax, which reduces their scope of applicability.

Another approach is to use Machine Learning techniques to start translating natural language queries into formal or machine data-query languages. Such approaches have a need in ground/truth as training data.

Accordingly, there is a need for methods which facilitate to gather such ground-truth in an efficient way.

SUMMARY

According to a first aspect, the invention is embodied as a computer-implemented method for generating ground-truth for natural language querying. The method comprises steps of providing a knowledge graph as data model, receiving a natural language query from a user and translating the natural language query into a formal data query. The method comprises further steps of visualizing the formal data query to the user and receiving a feedback response from the user. The feedback response comprises a verified and/or edited formal data query. The method comprises a further step of storing the natural language query and the corresponding feedback response as ground-truth pair.

Such methods according to embodiments of the invention may be used to generate natural language query ground-truth on knowledge graphs in an efficient way. Methods according to embodiments of the invention use a visual programming approach to generate the natural language query ground-truth. More particularly, the formal data query that has been translated from the natural language query is provided in a visual form to the user. The ground-truth is provided in pairs comprising the natural language query input and the corresponding feedback response. The feedback response may be on the one hand a verified formal data query. Such a verified formal data query indicates that the respective user has confirmed that the visualized formal data query is correct or in other words corresponds with his intent or understanding of the natural language query. On the other hand the feedback response may be an edited formal data query, in particular a corrected formal data query. In such an edited formal data query the user may edit, amend and/or correct the visualized formal data query if the visualized formal data query is not correct or does not correspond with his intent or understanding of the natural language query.

According to embodiments a formal data query shall be understood as a data query that has the format or form of a formal or machine data-query language. Hence a formal data query may also be denoted as a machine data-query. Query languages or data query languages (DQLs) may be generally defined as computer languages that can be used to make queries in databases and information systems. In contrast to natural language queries they are designed to communicate instructions to databases and information systems and they are usually composed of a set of operators or operation primitives.

According to an embodiment of the invention, translating the natural language query into a formal data query comprises steps of providing the natural language query to a workflow model and computing, by the workflow model, a workflow graph as formal data query.

Such a workflow model receives the natural language query as input and provides the workflow graph as output. The workflow graph establishes a visual representation of the workflow that has been used by the workflow model for the respective translation of the natural language query into the formal data query. The workflow graph may be in particular embodied as directed acyclical graph. The workflow graph may comprise a plurality of operators or in other words operation primitives, in particular an input operator, which may perform in particular a search for a particular type of input nodes, an edge traversal operator, a node filtering operator, a node ranking operator, logical operators such as "AND" and "OR" as well as an output operator.

According to an embodiment of the invention, the ground-truth pair may be used in a machine learning algorithm to train the workflow model. Such training improves the workflow model as well as the corresponding translation and responses of natural language queries in future inference phases of the trained workflow model.

According to embodiments, the formal data query may be visualized in a visual programming tool. The visual programming tool may be configured to provide a test functionality to test the natural language query. In other words, the user may input the natural language query and the methods provides the corresponding output, i.e. the results of the natural language query along with the visual representation of the formal data query.

In addition, according to embodiments the visual programming tool may be configured to provide an edit functionality to visually edit the formal data query. Such an edit functionality provides an edit tool that can be used to edit, correct, change and/or amend the visualized formal data query.

According to embodiments, translating the natural language query into a formal data query may comprise a step of identifying one or more input node types of the knowledge graph in the natural language query and a step of identifying one or more output node types of the knowledge graph in the natural language query. According to embodiments, the method may comprise a step of computing one or more search paths through the knowledge graph between the one or more input node types and the one or more output node types. The computation of the one or more search paths may be performed according to embodiments by a breadth-first-search algorithm.

According to embodiments, computing the one or more search paths comprises steps of providing the natural language query as string input to a natural language classifier and computing, by the natural language classifier, the one or more input node types and the one or more output node types. The use of such natural language classifiers is an efficient and reliable approach.

According to another aspect, the invention is embodied as a computer system for performing a computer-implemented method for generating ground-truth for natural language querying. The system comprises a processing unit, a storage system and a user interface comprising an input unit and a display. The system is configured to store a knowledge graph as data model in the storage system, to receive, via the user interface, a natural language query and to translate the natural language query into a formal data query. The system is further configured to visualize the formal data query on the display and to receive, via the input unit, a feedback response from a user. The feedback response comprises a verified and/or edited formal data query. The system is further configured to store the natural language query and the corresponding feedback response as ground-truth pair in the storage system.

According to yet another aspect of the invention a computer program product for performing a computer-implemented method for generating ground-truth for natural language querying on a computing system is provided. The computer program product comprises a computer readable storage medium having program instructions embodied therewith, the program instructions executable by the system to cause the system to perform a method comprising providing a knowledge graph as data model, receiving a natural language query from a user, translating the natural language query into a formal data query, visualizing the formal data query to the user, receiving a feedback response from the user and providing the natural language query and the corresponding feedback response as ground-truth pair.

According to yet another aspect of the invention a user interface comprising a display and an input unit is provided. The user interface is configured to receive a natural language query from a user, provide the natural language query to a translation module and to receive a formal data query from the translation module. The formal data query is a translation of the natural language query in a formal language. The user interface is further configured to visualize the formal data query on the display, receive a feedback response from the user and to provide the natural language query and the corresponding feedback response as ground-truth pair.

Embodiments of the invention will be described in more detail below, by way of illustrative and non-limiting examples, with reference to the accompanying drawings.

DETAILED DESCRIPTION

In reference to FIGS. 1-5e, some general aspects and terms of embodiments of the invention are described.

Embodiments of the invention provide a computer-implemented method to generate ground-truth for natural language querying in an efficient way.

The term ground truth may generally refer to information provided by direct observation (i.e. empirical evidence) as opposed to information provided by inference.

A graph according to embodiments of the invention is a knowledge representation system that comprises a plurality of nodes and a plurality of edges between the nodes. Hence a graph may be embodied as knowledge graph. The plurality of nodes may have various node types. The plurality of nodes may hold information about information items. The plurality of edges designates certain relationships between nodes.

More particularly, an instantiation of a graph or knowledge graph KG is a set of triplets: KG{V,E}, in which the set V contains a number of nodes, that have a type from an allowed set of types. The set E contains edges from an edge type list that link pairs of nodes from the set V. The underlying mathematical structure of the KG is a directed or undirected graph {V, E} in which the types of the nodes and edges may be represented by a numeric weighting scheme.

Knowledge Graphs are by far the most generic data-model, as they do not require any type of data-scheme and are very flexible with regard to changes, updates etc.

Embodiments of the invention allow users to make natural-language queries with enhanced functionalities. More particularly, the user may not only see the response of the respective natural language query, but may see, inspect and manually edit the internal workflow over a knowledge graph that led to those responses. This generates ground-truth which may be used to improve the responses to future queries.

Figure 1:
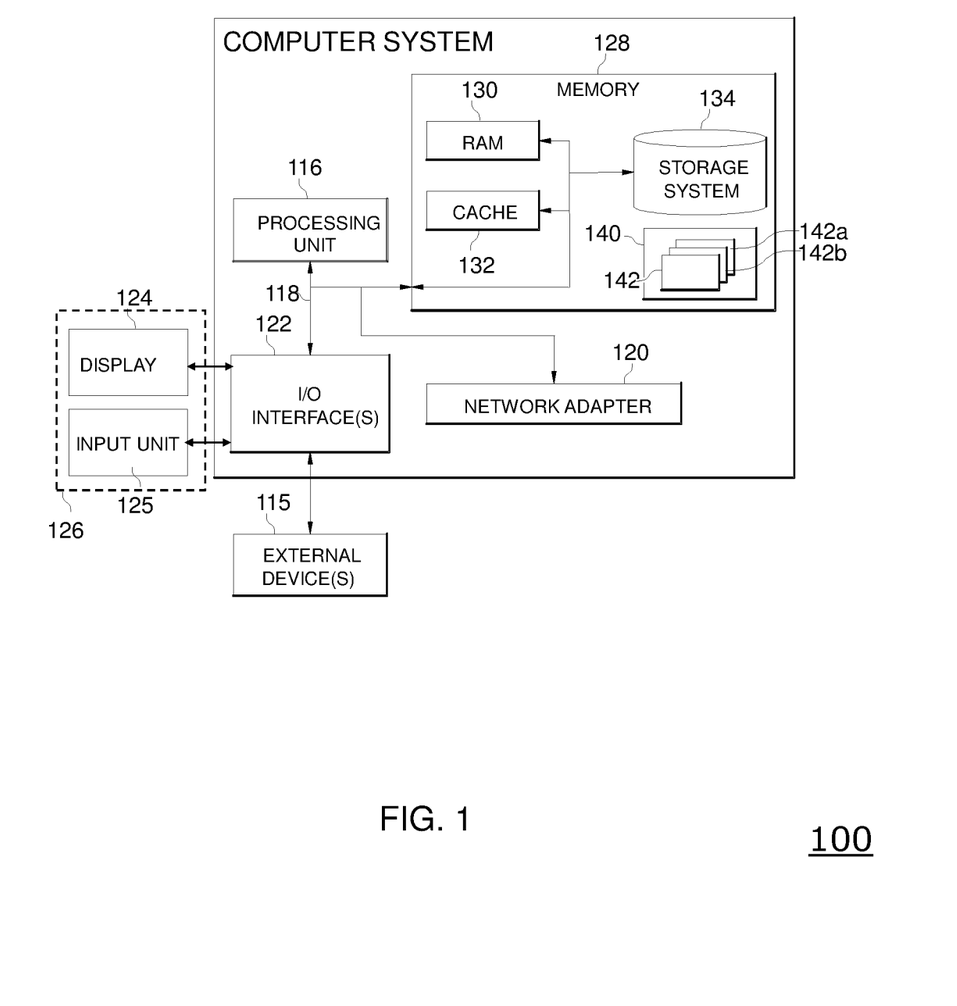
FIG. 1 shows a schematic block diagram of a computer system according to an embodiment of the invention.

Referring now to FIG. 1, a block diagram of a computer system 100 is illustrated. The computer system 100 may be configured to perform a computer-implemented method for generating ground-truth for natural language querying. The computer system 100 may be operational with numerous other general purpose or special purpose computing system environments or configurations. Examples of well-known computing systems, environments, and/or configurations that may be suitable for use with computer system 100 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 100 may be described in the general context of computer system-executable instructions, such as program modules, being executed by a computer system. Generally, program modules may include routines, programs, objects, components, logic, data structures, and so on that perform particular tasks or implement particular abstract data types. The computer system 100 is shown in the form of a general-purpose computing device. The components of computer system 100 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 100 typically includes a variety of computer system readable media. Such media may be any available media that is accessible by computer system 100, and it includes both volatile and non-volatile media, removable and non-removable media.

System memory 128 can include computer system readable media in the form of volatile memory, such as random access memory (RAM) 130 and/or cache memory 132. Computer system 100 may further include other removable/non-removable, volatile/non-volatile computer system storage media. By way of example only, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces. As will be further depicted and described below, memory 128 may include at least one program product having a set (e.g., at least one) of program modules that are configured to carry out the functions of embodiments of the invention.

Program/utility 140, having a set (at least one) of program modules 142, may be stored in memory 128 by way of example, and not limitation, as well as an operating system, one or more application programs, other program modules, and program data. The program modules 142 may encompass a translation module 142*a* and training module 142*b*. Each of the operating system, one or more application programs, other program modules, and program data or some combination thereof, may include an implementation of a networking environment. Program modules 142 generally carry out the functions and/or methodologies of embodiments of the invention as described herein. Program modules 142 may carry out in particular one or more steps of a computer-implemented method for generating ground-truth for natural language querying, e.g. one or more steps of the methods as described below.

Computer system 100 may also communicate with one or more external devices 115 such as an input unit 125, a pointing device, a display 124, etc.; one or more devices that enable a user to interact with computer system 100; and/or any devices (e.g., network card, modem, etc.) that enable computer system 100 to communicate with one or more other computing devices. Such communication can occur via Input/Output (I/O) interfaces 122. Still yet, computer system 100 can communicate with one or more networks such as a local area network (LAN), a general wide area network (WAN), and/or a public network (e.g., the Internet) via network adapter 120. As depicted, network adapter 120 communicates with the other components of computer system 100 via bus 118. It should be understood that although not shown, other hardware and/or software components could be used in conjunction with computer system 100. Examples, include, but are not limited to: microcode, device drivers, redundant processing units, external disk drive arrays, RAID systems, tape drives, and data archival storage systems, etc. The input unit 125, e.g. a keyboard and the display 124 establish a user interface 126.

Figure 2:
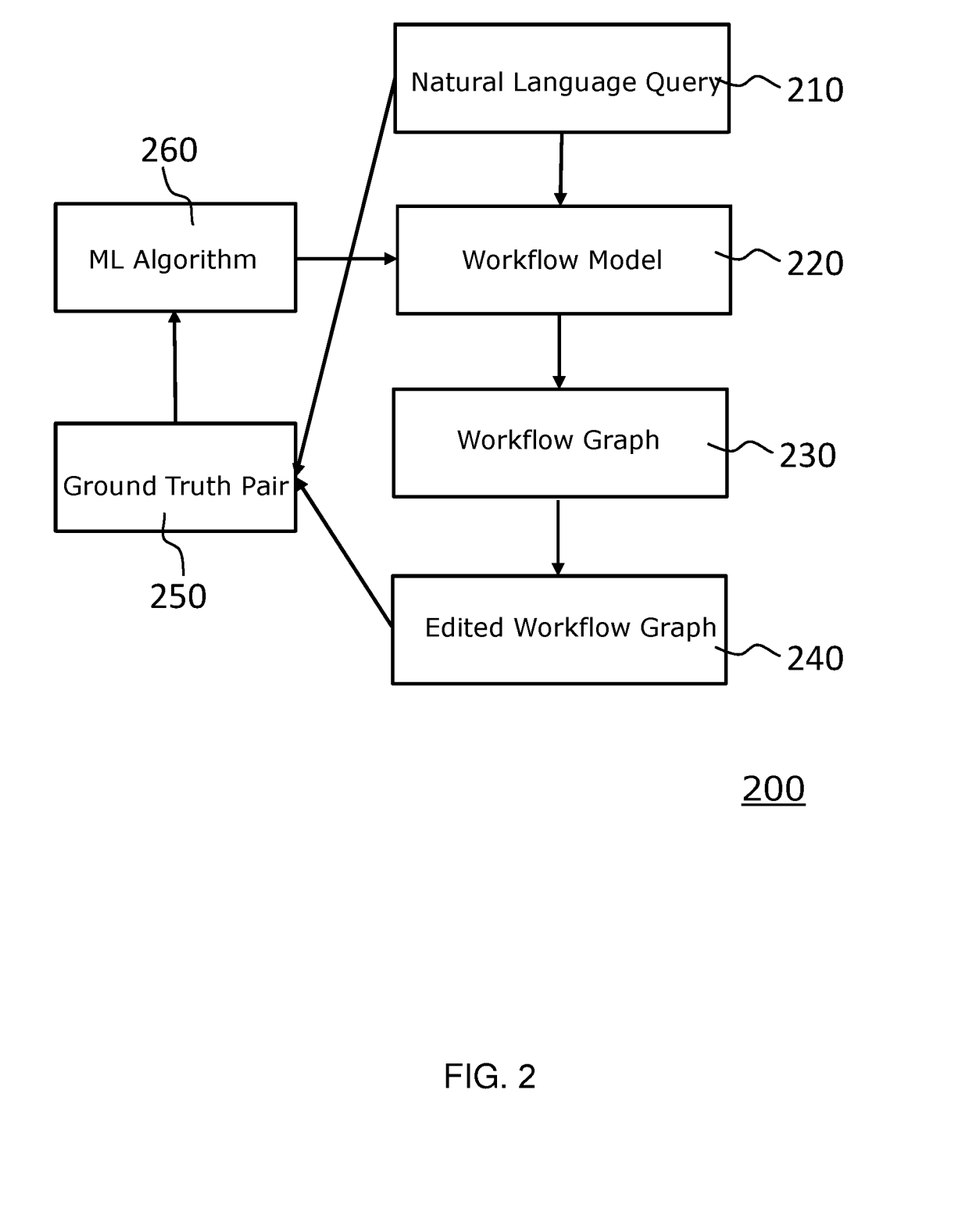
FIG. 2 shows a functional block diagram illustrating functional blocks of a computer system for performing a computer-implemented method for generating ground-truth for natural language querying.

FIG. 2 shows a functional block diagram illustrating functional blocks of a computer system 200 for performing a computer-implemented method for generating ground-truth for natural language querying.

The system 200 is configured to receive a natural language query 210 as input, e.g. from a user via an input unit, e.g. the input unit 125 as shown in FIG. 1.

The natural language query 210 is then fed as input to a workflow model 220. The workflow model 220 translates the natural language query 210 into a formal data query. More particularly, it computes a workflow graph 230 as formal data query. The workflow graph is then displayed to the user and the user may provide an edited workflow graph 240 as feedback response. The natural language query 210 and the corresponding edited workflow graph 240 form together a ground-truth pair 250. The ground-truth pair 250 may then be used by a machine-learning algorithm 260 to update and improve the workflow model 220.

Figure 3:
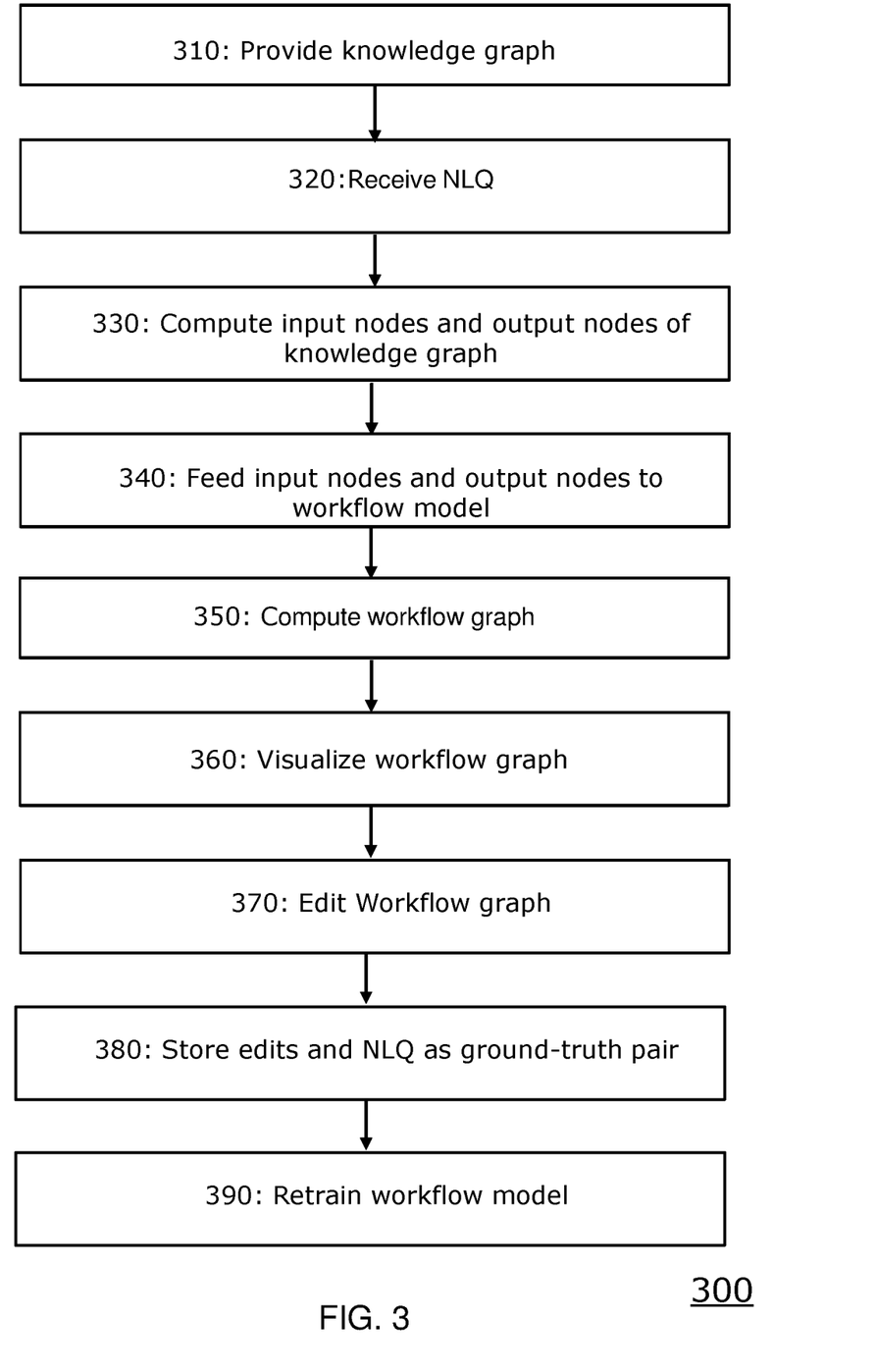
FIG. 3 shows a flow chart of methods steps of a computer-implemented method for generating ground-truth for natural language querying according to an embodiment of the invention.

FIG. 3 shows a flow chart of methods steps of a computer-implemented method for generating ground-truth for natural language querying according to an embodiment of the invention. The method may be performed e.g. by the system 100 of FIG. 1 and will hence be described in the following with reference to the components of the system of FIG. 1. The method may be in particular performed under control of the translation module 142*a* that is running on the system 100.

At a step 310, a knowledge graph is provided as data model. The knowledge graph may be stored e.g. in the storage system 134 of the computing system 100.

At a step 320, a natural language query (NLQ) is received from a user of the computing system 100, e.g. via the input unit 125.

At a step 330, one or more input node types and one or more output node types are computationally identified in the received natural language query. This may be performed in particular by providing the natural language query as string input to a natural language classifier. The natural language classifier may then compute the one or more input node types and the one or more output node types. The natural language classifier may use e.g. string classification methods and/or sequence to sequence models.

At a step 340, the identified input nodes and output nodes are fed to a workflow model.

The workflow model computes, at a step 350, a workflow graph. The workflow graph establishes a formal or machine data query of the natural language query.

Accordingly, the steps 330 to 350 perform a translation of the received natural language query into the formal data query embodied as workflow graph.

At a step 360, the workflow graph is visualized to the user, e.g. by displaying it on the display 124 of the computing system 100.

The user can then visually inspect and check the displayed workflow graph. In particular, the user can check whether the workflow graph and the results correspond with his desired meaning and intent of the natural language query.

At a step 370 the user may then edit the workflow graph and provide thereby feedback in the form of a feedback response to the system 100, e.g. via the input unit 125. The feedback response may comprise in particular an edited workflow graph.

At a step 380, the system 100 may store the feedback response, in particular the edits of the workflow graph and the corresponding natural language query, as ground-truth pairs. The ground-truth pairs may be stored e.g. in the storage system 134 of the computing system 100.

The ground-truth pair may then be used at a step 390 to train or retrain the workflow model to improve the responses of the system 100 for future natural language queries.

FIGS. 4a to 4e illustrate an example of a computer-implemented method for generating ground-truth for natural language querying according to an embodiment of the invention.

Figure 4A:
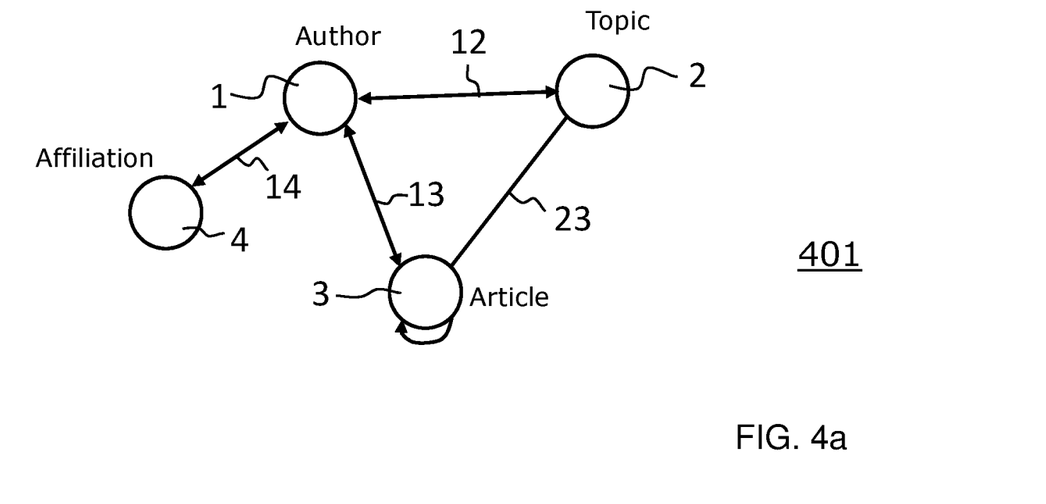
FIG. 4a shows an exemplary knowledge graph which is used as data model for a natural language query.

FIG. 4a shows a knowledge graph 401 which is used as data model for the natural language query. According to the illustrated example the knowledge graph 401 comprises four nodes 1, 2, 3 and 4, an edge 12 between the nodes 1 and 2, an edge 14 between the nodes 1 and 4, and edge 13 between the nodes 1 and 3 and an edge 23 between the nodes 2 and 3. The nodes and edges have been grouped into types, i.e. the knowledge graph 401 has a set of nodes and edges of a certain type. More particularly, FIG. 4a represents a "citation-graph" and comprises nodes of the following types: articles, authors, topics and affiliations. The edges of this graph also have a certain type, i.e. "article-to-article", "article-to-author", "article-to-topic" and "author-to-affiliation". Hence the knowledge graph 401 is embodied as a meta-graph comprising the node types articles, authors, topics and affiliations and the edge types "article-to-article", "article-to-author", "article-to-topic", "author-to-topic" and "author-to-affiliation".

According to embodiments such a meta-graph may be denoted as the topology of the original knowledge graph, wherein the original knowledge graph is the knowledge graph from which the meta-graph has been derived. The topology and hence the meta-graph of the original knowledge graph does not change as long as no new type of node gets inserted into the knowledge graph. One can insert many more documents into the knowledge graph without changing the topology of the meta-graph, i.e. in this example of the citation graph.

Generally nearly all knowledge graphs can be described by such a topology or meta-graph, provided that each of the nodes and edges in the knowledge graph represent a certain concept or type.

Figure 4B:
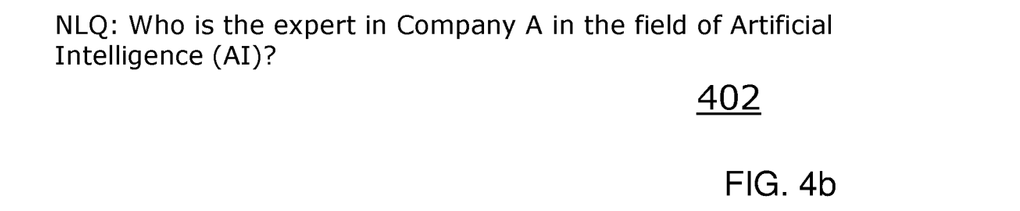
FIG. 4b shows an example of a natural language query.

FIG. 4b shows an example of a natural language query. In this example the natural language query reads as follows: "Who is the expert in Company A in the field of Artificial Intelligence (AI)"?

Figure 4C:
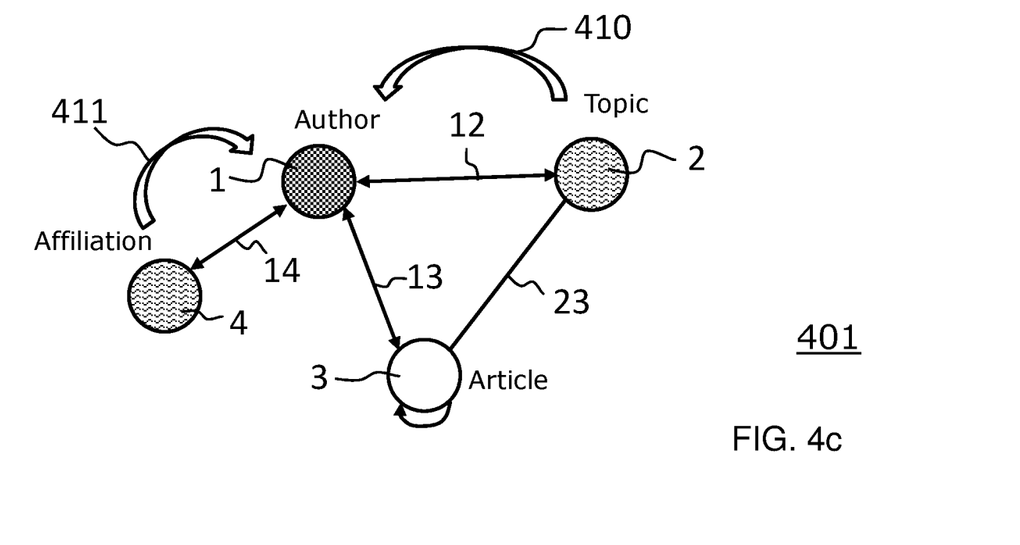
FIG. 4c shows how the knowledge graph of FIG. 4a is used for translating the natural language query into a formal data query.

FIG. 4c shows how the meta-graph of FIG. 4a is used for translating the natural language query 402 into a formal data query. The method identifies node 2 (topic) and node 4 (affiliation) as input nodes in the natural language query 402 and node 1 (author) as output node type of the knowledge graph 401 in the natural language query 402. The identified input node types are illustrated with a wave pattern and the identified output node type with a checkerboard pattern. The input node types and the output node types may be identified by providing the natural language query 402 as string input to a natural language classifier. The natural language classifier may then compute input node types and output node types from the natural language query string 402.

In addition, the computing system 100 computes search paths between the input node types and the output node types. In this example a search path 410 is computed between the node 2 of the type "topic" and the node 1 of the type "author" as well as a search path 411 between the node 4 of the type "affiliation" and the node 1 of the type "author".

Figure 4D:
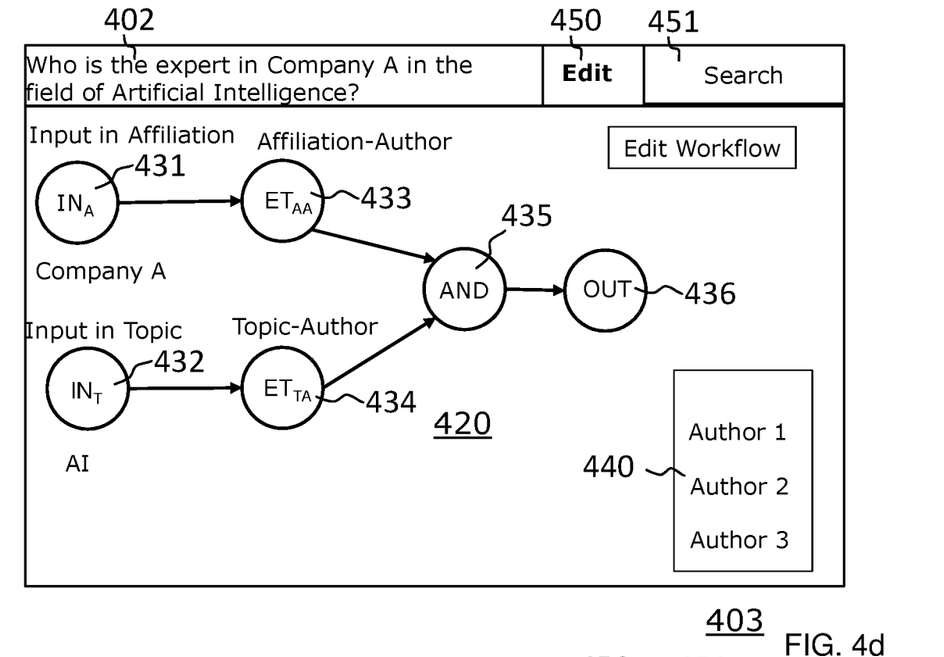
FIG. 4d shows a screen layout comprising a workflow graph.

FIG. 4d shows a screen layout 403 that may be displayed e.g. by the display 124 of FIG. 1. The screen layout 403 comprises a workflow graph 420 which is embodied as a directed acyclical graph. The workflow graph 420 represents a formal data query that has been translated or in other words derived from the natural language query 402 by a translation module, e.g. by the translation module 142a of FIG. 1. The translation module uses an underlying workflow model for the computation of the workflow graph 420. The workflow graph 420 may comprise a plurality of operators or operation primitives. Such operators may encompass e.g. an input operator, which may perform in particular a search for a particular type of input nodes. Further operators include an edge traversal operator which may perform an edge traversal between two different types of nodes, a node filtering operator that filters nodes according to one or more criteria and a node ranking operator that ranks nodes according to one or more predefined criteria. As further examples, logical operators such as "AND" and "OR" as well as an output operator may be used.

The workflow graph 420 comprises an input operator 431, which provides an "Input in Affiliation" $IN_A$ and performs a search for "Company A" in all the input type nodes having the type "Affiliation". The workflow graph 420 comprises a further input operator 432, which provides an "Input in Topic" $IN_T$ and performs a search for "Artificial Intelligence" in all the input type nodes having the type "Topic". The workflow graph 420 comprises an edge traversal operator 433, which performs an edge traversal $ET_{AA}$ "Affiliation-Author" between the identified nodes of the type "Affiliation" comprising the term "Company A" and the corresponding nodes of the type "Author". The workflow graph 420 comprises a further edge traversal operator 434, which performs an edge traversal $ET_{TA}$ "Topic-Author" between the identified nodes of the type "Topic" comprising the term "Artificial Intelligence" and the corresponding nodes of the type "Author". The outputs of the edge traversal operator 433 and the edge traversal operator 434 are then merged by an "AND" operator 435, i.e. the "AND" operator 435 performs an intersection of the outputs of the edge traversal operator 433 and the edge traversal operator 434. An output operator 435 produces then a result 440 of the natural language query 402 and displays it on the screen layout 403. In this example the result 440 comprises a list of authors "Author1, Author2, Author 3". According to this example it is assumed that the workflow model shows the result in the form of the list of authors in an alphabetical manner.

The visual programming tool provides an edit functionality to visually edit the formal data query. In FIG. 4d the tool is in the edit-mode which is indicated by the bold illustration of the term "Edit" representing an edit-button 450. This means the user may edit the workflow graph 420, in particular by deleting, amending or adding one or more operators of the workflow graph 420.

Figure 4E:
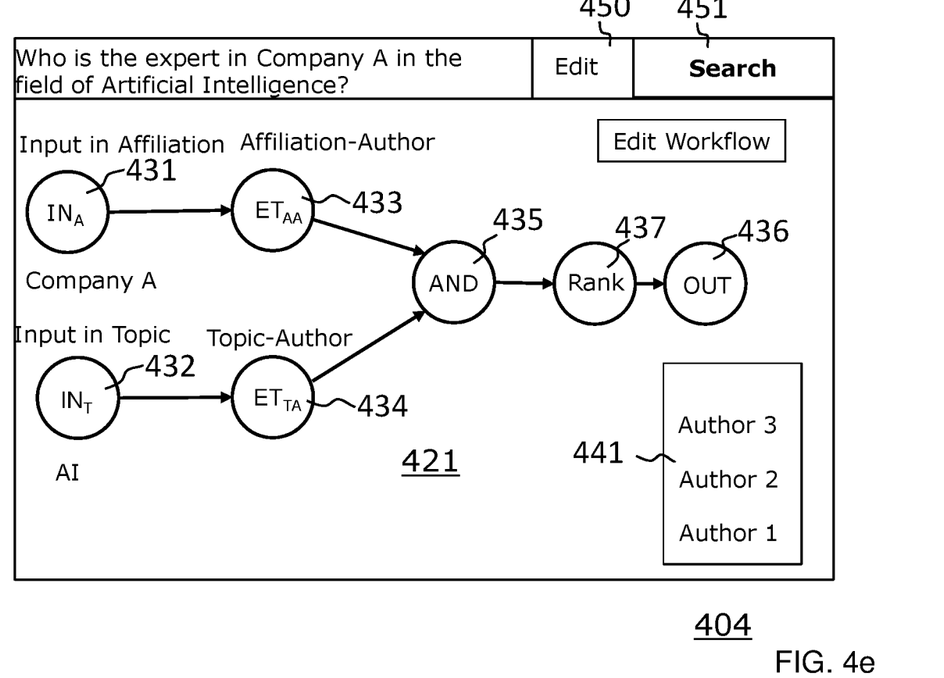
FIG. 4e shows a screen layout comprising an edited workflow graph.

FIG. 4e shows a screen layout 404 comprising an edited workflow graph 421. The workflow graph 421 represents an edited formal data query that has been edited by the user after she has inspected the original workflow graph 420. Compared with the original workflow graph 420, the user has inserted a ranking operator 437. The ranking operator 437 may be e.g. an operator that ranks the results (authors) according to the number of citations. Accordingly the user was not entirely happy with the result 440 comprising an alphabetical ordering of the result, but would have preferred a ranking according to the number of citations. The visual programming tool provides a test functionality to test the natural language query. Accordingly, the user may then test the edited workflow graph 421 by activating a search button 451. Upon activation, the screen layout shows the amended result 441 comprising the authors "Author 3, Author 2, Authors 1" sorted by the number of citations.

The computer system 100 may then store the natural language query 402 together with the edited workflow graph 421 (formal data query) as ground-truth pair in the storage system 134. This ground-truth-pair, preferably in combination with a plurality of further ground-truth pairs, may then be used by the training module 142b to train the translation module 142a. And if the computing system 100 receives the next time a similar query, it will provide the result list of e.g. the authors in a ranked manner.

FIGS. 5a to 5e illustrate an example of a computer-implemented method for generating ground-truth for natural language querying according to another embodiment of the invention. The example of FIGS. 5a to 5e corresponds partly to the example of FIGS. 4a to 4e and the same or similar elements are hence denoted with the same reference numerals.

Figure 5A:
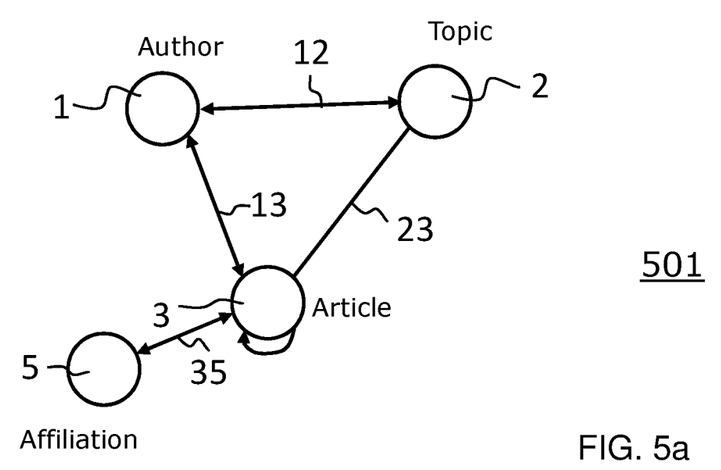
FIG. 5a shows another exemplary knowledge graph.

FIG. 5a shows a knowledge graph 501 which is used as another data model for the natural language query. According to the illustrated example the knowledge graph 501 comprises four nodes 1, 2, 3 and 5, an edge 12 between the nodes 1 and 2, an edge 13 between the nodes 1 and 3, an edge 23 between the nodes 2 and 3 and, in contrast to FIG. 4a, an edge 35 between the nodes 3 and 5. The nodes and edges have been grouped into types, i.e. the knowledge graph 501 has a set of nodes and edges of a certain type. More particularly, FIG. 5a also represents a "citation-graph" and comprises the same nodes of the types "articles", "authors", "topics" and "affiliations" as in the example of FIG. 4a. The edges of this graph also encompass the types "article-to-article", "article-to-author", "article-to-topic", "author-to-topic", but instead of "author-to-affiliation" the edge 35 "article-to-affiliation"

Hence the knowledge graph 501 is also embodied as a meta-graph representing the topology of the original graph.

Figure 5B:
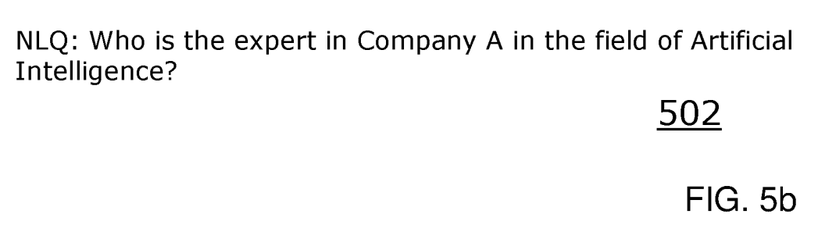
FIG. 5b shows an example of a natural language query.

FIG. 5b shows an example of a natural language query 502. In this example the same natural language query is used as in the previous example, namely "Who is the expert in Company A in the field of Artificial Intelligence (AI)"?

Figure 5C:
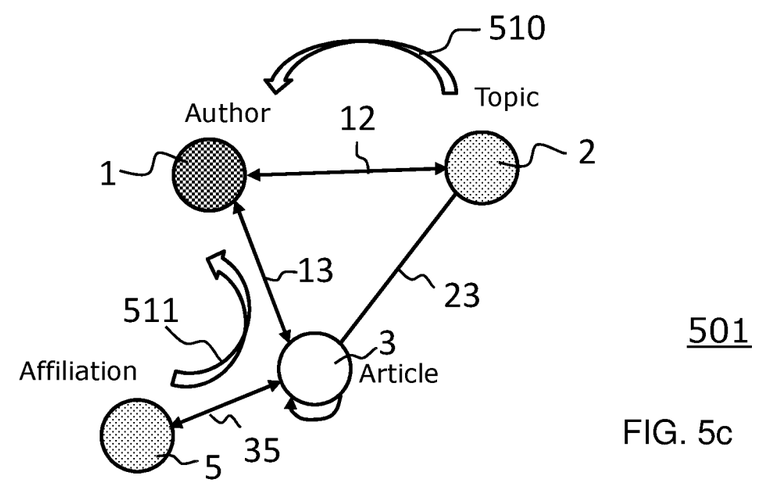
FIG. 5c illustrates a usage of the knowledge graph of FIG. 5a for translating the natural language query into a formal data query.

FIG. 5c shows how the meta-graph of FIG. 5a is used for translating the natural language query 502 into a formal data query. The method identifies node 2 (topic) and node 5 (affiliation) as input nodes in the natural language query 502 and node 1 (author) as output node type. The identified input node types are illustrated with a wave pattern and the identified output node type with a checkerboard pattern. The computing system 100 computes search paths between the input node types and the output node types. In this example a search path 510 is computed between the node 2 of the type "topic" and the node 1 of the type "author" as well as a search path 511 between the node 5 of the type "affiliation" and the node 1 of the type "author", via the node 3 of the type "article".

Figure 5D:
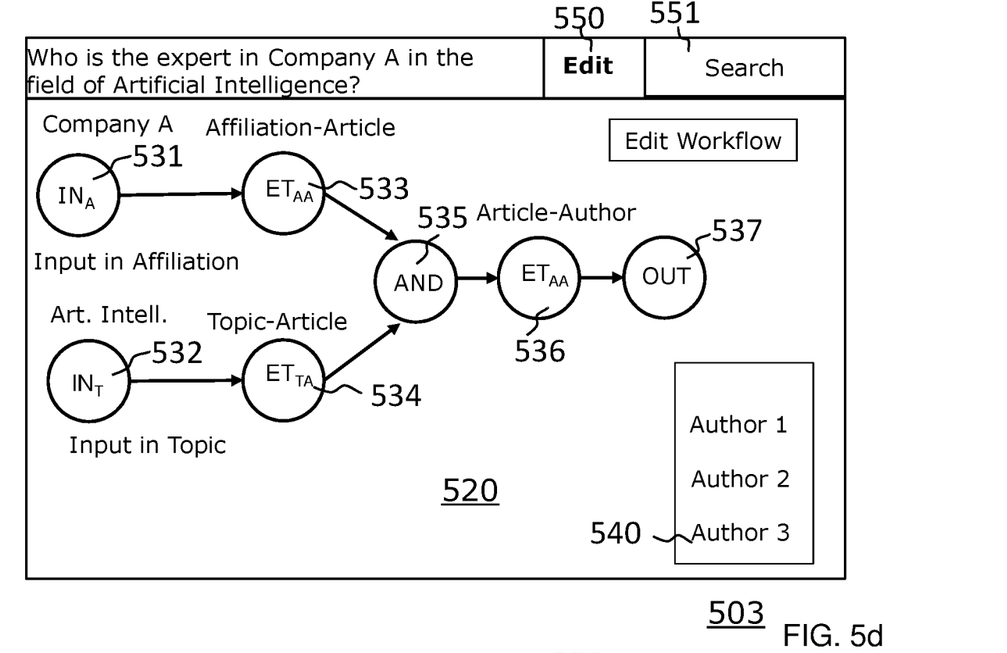
FIG. 5d shows a screen layout comprising a workflow graph.

FIG. 5d shows a screen layout 503 that may be displayed e.g. by the display 124 of FIG. 1. The screen layout 503 comprises a workflow graph 520 which is embodied as a directed acyclical graph. The workflow graph 520 represents a formal data query that has been translated or in other words derived from the natural language query 502 by a translation module, e.g. by the translation module 142a of FIG. 1. The translation module uses an underlying workflow model for the computation of the workflow graph 520. The workflow graph 520 comprises an input operator 531, which performs a search for "Company A" in all the input type nodes having the type "Affiliation". The workflow graph 520 comprises a further input operator 532, which performs a search for "Artificial Intelligence" in all the input type nodes having the type "Topic". The workflow graph 520 comprises an edge traversal operator 533, which performs an edge traversal "Affiliation-Article" between the identified nodes of the type "Affiliation" comprising the term "Company A" and the corresponding nodes of the type "Article". The workflow graph 520 comprises a further edge traversal operator 534, which performs an edge traversal "Topic-Article" between the identified nodes of the type "Topic" comprising the term "Artificial Intelligence" and the corresponding nodes of the type "Article". The outputs of the edge traversal operator 533 and the edge traversal operator 534 are then merged by an "AND" operator 535, i.e. the "AND" operator 535 performs an intersection of the outputs of the edge traversal operator 533 and the edge traversal operator 534. In this example an additional edge traversal operator 536 is provided which performs an edge traversal $ET_{AA}$ "Article-Author". An output operator 537 produces then a result 540 of the natural language query 502 and displays it on the screen layout 503. In this example the result 540 comprises a list of authors "Author 1, Author 2, Author 3". According to this example it is assumed that the workflow model shows the result in the form of the list of authors in an alphabetical manner.

In FIG. 5d the visual programming tool is again in the edit-mode which is indicated by the bold illustration of the term "Edit mode" of an edit-button/field 550. This means the user may edit the workflow graph 520.

Figure 5E:
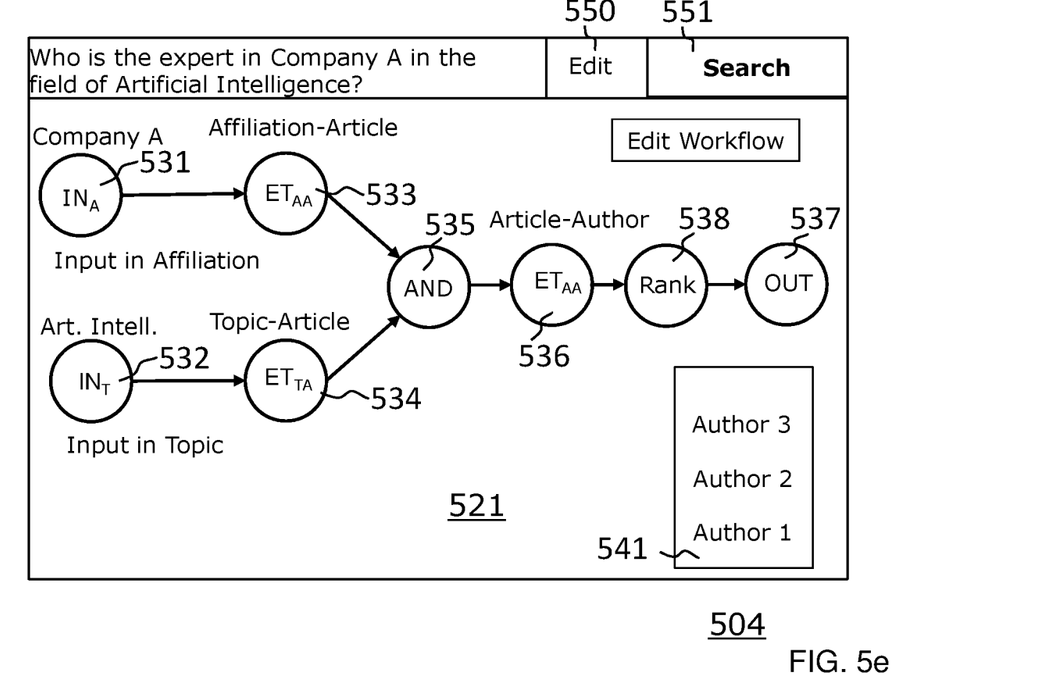
FIG. 5e shows a screen layout comprising an edited workflow graph.

FIG. 5e shows a screen layout 504 comprising an edited workflow graph 521. The workflow graph 521 represents an edited formal data query that has been edited by the user after she has inspected the original workflow graph 520. Compared with the original workflow graph 520, the user has inserted a ranking operator 538. The ranking operator 538 is configured to rank the results (authors) according to the number of citations. The visual programming tool provides a test functionality to test the natural language query. Accordingly, the user may then test the edited workflow graph 521 by activating a search button 551. Upon activation, the screen layout 504 shows the amended result 541 comprising the authors "Author 3, Author 2, Author 1" sorted by the number of citations.

The computer system 100 may then store the natural language query 502 together with the workflow graph 521 (formal data query) as ground-truth pair in the storage system 134. This ground-truth-pair, preferably in combination with a plurality of further ground-truth pairs, may then be used by the training module 142b to train the translation module 142a.

The present invention may be a system, a method, and/or a computer program product. The computer program product may include a computer readable storage medium (or media) having computer readable program instructions thereon for causing a processor/processing unit of the computer system 100 to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for generating ground-truth for natural language querying, the method comprising:
   providing a knowledge graph as data model;
   receiving a natural language query from a user;
   translating the natural language query into a formal data query;
   visualizing the formal data query to the user;
   receiving a feedback response from the user, the feedback response comprising a verified and/or edited formal data query; and
   storing the natural language query and the corresponding feedback response as ground-truth pair,
   wherein translating the natural language query into a formal data query comprises:
      identifying one or more input node types of the knowledge graph in the natural language query; and
      identifying one or more output node types of the knowledge graph in the natural language query,
   wherein the one or more output node types correspond to one or more responses for responding to the natural language query.

2. The computer-implemented method according to claim 1, wherein translating the natural language query into a formal data query comprises:
   providing the natural language query to a workflow model; and
   computing, by the workflow model, a workflow graph as formal data query.

3. The A computer-implemented method according to claim 2, further comprising:
   using the ground-truth pair in a machine learning algorithm to train the workflow model.

4. The A computer-implemented method according to claim 2, wherein the workflow graph is a directed acyclical graph.

5. The computer-implemented method according to claim 2, wherein the workflow graph comprises a plurality of operators.

6. The computer-implemented method according to claim 5, wherein the plurality of operators are selected from the group consisting of:
   an input operator;
   an edge traversal operator;
   a node filtering operator;
   a node ranking operator;
   logical operators; and
   an output operator.

7. The computer-implemented method according to claim 1, wherein translating the natural language query into a formal data query comprises:
   computing one or more search paths through the knowledge graph between the one or more input node types and the one or more output node types.

8. The computer-implemented method according to claim 7, wherein computing the one or more search paths comprises performing a breadth-first-search algorithm.

9. The computer-implemented method according to claim 1, wherein computing the one or more search paths comprises:
   providing the natural language query as string input to a natural language classifier; and
   computing, by the natural language classifier, the one or more input node types and the one or more output node types.

10. The computer-implemented method according to claim 1, wherein visualizing the formal data query comprises:
    visualizing the formal data query in a visual programming tool.

11. The computer-implemented method according to claim 10, wherein the visual programming tool is configured to provide a test functionality to test the natural language query.

12. The computer-implemented method according to claim 10, wherein the visual programming tool is configured to provide an edit functionality to visually edit the formal data query.

13. A computer system for performing a computer-implemented method for generating ground-truth for natural language querying, the system comprising a processing unit, a storage system and a user interface comprising an input unit and a display, the system being configured to:
    store a knowledge graph as data model in the storage system;
    receive, via the user interface, a natural language query;
    translate the natural language query into a formal data query;
    visualize the formal data query on the display;
    receive, via the input unit, a feedback response from a user, the feedback response comprising a verified and/or edited formal data query; and
    store the natural language query and the corresponding feedback response as ground-truth pair in the storage system,
    the system further being configured to:
       identify input node types of the knowledge graph in the natural language query;
       identify output node types of the knowledge graph in the natural language query,
       wherein the output node types correspond to a response for responding to the natural language query.

14. The computer system according to claim 13, the system comprising:
    a translation module configured to translate the natural language query into the formal data query, the translation module comprising a workflow model;
    a training module configured to:
       receive the ground-truth pair;
       perform a training of the workflow model by means of a machine learning algorithm; and
       update the workflow model.

15. The computer system according to claim 14, wherein the translation module is configured to:
    identify the input node types of the knowledge graph in the natural language query;
    identify the output node types of the knowledge graph in the natural language query; and
    compute a workflow graph as formal data query.

16. The computer system according to claim 15, wherein the workflow graph is a directed acyclical graph.

17. A computer program product for performing a computer-implemented method for generating ground-truth for natural language querying on a computing system, the computer program product comprising a computer readable storage medium having program instructions embodied therewith, the program instructions executable by the system to cause the system to perform a method comprising:
providing a knowledge graph as data model;
receiving a natural language query from a user;
translating the natural language query into a formal data query;
visualizing the formal data query to the user;
receiving a feedback response from the user, the feedback response comprising a verified and/or edited formal data query; and
providing the natural language query and the corresponding feedback response as ground-truth pair,
wherein translating the natural language query into a formal data query comprises:
identifying one or more input node types of the knowledge graph in the natural language query; and
identifying one or more output node types of the knowledge graph in the natural language query,
wherein the one or more output node types correspond to one or more responses for responding to the natural language query.

18. The computer program product according to claim 17, wherein translating the natural language query into a formal data query comprises:
providing the natural language query to a workflow model; and
computing, by the workflow model, a workflow graph as formal data query.

19. The computer program product according to claim 17, further comprising:
using the ground-truth pair in a machine learning algorithm to train the workflow model.

20. The computer program product according to claim 18, wherein the workflow graph is a directed acyclical graph.

21. A user interface comprising a display and an input unit, the user interface being configured to:
receive a natural language query from a user;
provide the natural language query to a translation module;
receive a formal data query from the translation module, the formal data query being a translation of the natural language query in a formal language;
visualize the formal data query on the display;
receive a feedback response from the user, the feedback response comprising a verified and/or edited formal data query; and
provide the natural language query and the corresponding feedback response as ground-truth pair,
wherein the translation module translates the natural language query into the formal data query at least by identifying an input node type of a knowledge graph in the natural language query and identifying an output node type of the knowledge graph in the natural language query, wherein the output node type corresponds a response for responding to the natural language query.

22. The user interface according to claim 21, wherein visualizing the formal data query comprises:
displaying a workflow graph as formal data query.

23. The user interface according to claim 21, wherein the user interface is configured to provide a test functionality to test the natural language query.

24. The user interface according to claim 21, wherein the user interface is configured to provide an edit functionality to visually edit the workflow graph.

* * * * *